United States Patent Office 3,481,990
Patented Dec. 2, 1969

3,481,990
2,6-DIARYLPHENOLS
Allan S. Hay, Schenectady, N.Y., assignor to General Electric Company, a corporation of New York
No Drawing. Filed May 2, 1966, Ser. No. 546,508
Int. Cl. C07c *27/12, 31/14*
U.S. Cl. 260—619    7 Claims

ABSTRACT OF THE DISCLOSURE

This invention relates to the novel phenols having the formula

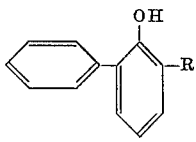

where R is a monovalent substituent selected from the group consisting of $C_{1-8}$ alkyl substituted phenyl, biphenylyl, terphenylyl and napthyl. These phenols are very useful for the making of the corresponding polyphenylene ethers.

---

This invention relates to 2,6-diarylphenols. More specifically, this invention relates to 2,6-diarylphenols, where one of the substituents is phenyl and the other substituent is selected from the group consisting of phenyl having from 1 to 2 $C_{1-8}$ alkyl substituents, biphenylyl, terphenylyl and naphthyl. These phenols may be represented by the formula

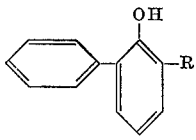

where R is a monovalent substituent selected from the group consisting of $C_{1-8}$ alkyl substituted phenyl, biphenylyl, terphenylyl and naphthyl.

2,6-disubstituted phenols, as a general class, are an extremely interesting group of phenols, since they are readily oxidatively coupled to form poly(2,6-disubstituted-1,4-phenylene ethers). These phenols, where both substituents are alkyl, one is alkyl and the other halogen, or one is alkyl and the other aryl, are well known chemical compounds. However, the only known 2-6-diarylphenol is 2,6-diphenylphenol. The polyyphenylene ethers prepared from 2,-6-diphenylphenol are more oxidatively stable than the polyphenylene ethers prepared from 2,6-di-substituted phenols, where one or both of the substituents are alkyl.

Poly(2,6-diphenyl-1,4-phenylene ether) has proven to be a very interesting polymer. It is a thermoplastic polymer with a very high softening point and excellent thermostability. However, it has one characteristic that makes it extremely difficult to mold into many desired objects. Although the polymer can be made as an amorphous material, when heated above its softening or melting point ($Tm$) of about 480° C., it readily crystallizes on cooling with the crystallites being unoriented. It will also crystallize when heated to a temperature in the range of 260° C. up to $Tm$. This is undesirable in molded objects, since the molded object in the unoriented crystalline state tends to be brittle. Since it is necessary to heat the polymer above its glass-transition temperature ($Tg$) to mold or shape it, it is necessary to mold this material in the narrow temperature range between $Tg$ and about 260° C. to avoid crystallization.

However, crystallinity or rather the ability to crystallize is highly desirable in polymers used for making films and fibers, in which the crystallites are oriented by "cold drawing," i.e., stretching at a temperature below $Tm$ and generally in the range between $Tg$ and $Tm$ after the polymer is in the crystalline state. The tendency of poly(2,6-diphenyl-1,4-phenylene ether) to crystallize is so great that solutions of the amorphous polymer in certain solvents, for example, on standing, gradually precipitate the polymer in the crystalline form. The crystalline form is insoluble in almost all of the solvents in which the amorphous form of the polymer is soluble. It is believed that the tendency of this polymer to crystallize so readily is due to the fact that both substituents are the same and both are large, bulky groups.

It would be highly desirable to be able to make a polymer having the high softening point and high oxidation resistance of the poly(2,6-diphenyl-1,4-phenylene ether) but without the tendency to crystallize. As disclosed in my copending application Ser. No. 593,733 filed Nov. 14, 1966 and assigned to the same assignee as the present invention, I have disclosed and claimed such polymers made from 2,6-diarylphenols where the two aryl substituents are different. In order to make such polymers, the synthesis of the starting phenols which are new chemical compounds is required. These compounds are the subject matter of the present invention.

As stated previously, these phenols have one substituent which is phenyl and the other is selected from the group consisting of mono- and di- $C_{1-8}$ alkyl substituted phenyl, biphenylyl, terphenylyl and naphthyl. Typical examples of the phenyl having from 1 to 2 $C_{1-8}$ alkyl substituents are 2-methylphenyl, 3-methylphenyl, 4-methylphenyl, 2,4-dimethylphenyl, 2,5-dimethylphenyl, 2-propylphenyl, 2,4-dipropylphenyl, 4-isopropylphenyl, 4-butylphenyl, 2-n-butylphenyl, 3-isobutylphenyl, 2,3-di-n-butylphenyl, the isomeric mono- and di-hexylphenyls, the isomeric mono- and di-octyphenyls, etc. The biphenylyl may be ortho, meta or para-biphenylyl and the terphenylyl may be any of the isomeric terphenylyls; for example, the o-terphenylyl, m-terphenylyl, and p-terphenylyl which alternatively may be named as diphenyl-substituted phenyls; for example, 2,3-diphenylphenyl, 2,4-diphenylphenyl, 2,5-diphenylphenyl, 2,6-diphenylphenyl, 3,4-diphenylphenyl, 3,5-diphenylphenyl, 2-(o-biphenylphenyl) 2-(m-biphenyl)phenyl, 2-(p-biphenyl)phenyl, 3-(o-biphenyl)phenyl, etc. The naphthyl may be either α or β naphthyl.

Typical of some of the phenols of the 2,6-diaryl substituted phenols of this invention having the above substituents are by way of example:

2-phenyl-6-(2'-methylphenyl)phenol,
2-phenyl-6-(3'-methylphenyl)phenol,
2-phenyl-6-(4'-methylphenyl)phenol,
2-phenyl-6-(2'-propylphenyl)phenol,
2-(4'-isopropylphenyl)-6-phenylphenol,
2-(2'-butylphenyl)-6-phenylphenol,
2-(4'-t-butylphenyl)-6-phenylphenol,
2-(2'-hexylphenyl)-6-phenylphenol,
2-phenyl-6-(4-octylphenyl)phenol,
2-(o-biphenylyl)-6-phenylphenol.
2-(m-biphenylyl)-6-phenylphenol,
2-(p-biphenylyl)-6-phenylphenol,
2-phenyl-6-(3'-o-terphenylyl)phenol,
i.e.,
2-(2',3'-diphenylphenyl-6-phenyl)phenol,
2-phenyl-6-(4'-m-terphenylyl)phenol,
i.e.,
2-(2',4'-diphenylphenyl-6-phenyl)phenol,
2-phenyl-6-(4'-p-terphenylyl)phenol,
2-(α-naphthyl)-6-phenylphenol,
2-(β-naphthyl)-6-phenylphenol, etc.

These chemical compounds are most conveniently prepared by preparing the methyl ether of 2-chloro-6-phenylphenol, reacting the ether with magnesium to prepare the Grignard reagent which is then reacted with the appropriate cycloaliphatic ketone; e.g., cycloalkyl or cycloalkylene ketone, thereafter dehydrogenating this substituent on the phenol by heating in the presence of platinum of palladium and thereafter, demethylating the ether to the desired phenol. Another method for making the 2-(m-biphenylyl)-6-phenylphenol comprises introducing the cyclohexenyl group on the 1-position of dibenzofuran followed by dehydrogenation of the cyclohexenyl group to the phenyl group, repeating these two steps to introduce a phenyl group on the 8-position, cleaving the ring at the oxygen group with either sodium or lithium metal, and finally by hydrolyzing the mixture to the desired phenol. Another method for the preparation of 2-(o-biphenylyl)-6-phenylphenol involves the self-condensation of either 2-phenylcyclohexanone or 2-cyclohexylcyclohexanone to produce, respectively, 2-phenyl-6-(2'-phenylcyclohexenyl)cyclohexanone or 2 - cyclohexyl-6-(2'-cyclohexylcyclohexenyl)cyclohexanone followed by dehydrogenation to the desired phenol.

In order that those skilled in the art may better understand how to practice my invention, the following examples are given by way of illustration and not by way of limitation. All percentages are by weight unless otherwise stated.

Example 1

This example illustrates the preparation of the methyl ether of 2-chloro-6-phenylphenol. A mixture of 307 g. of 2-chloro-6-phenylphenol and 250 ml. of a 25% aqueous solution of sodium hydroxide was stirred in a four-necked, five-liter flask with a dropping funnel, thermometer, rotating stirrer and condenser. While this mixture was being stirred and cooled in an ice bath at 10° C., 189 ml. of dimethylsulfate was added dropwise in such a way that the temperature of the reaction mixture did not exceed 15° C. After the addition was completed, the mixture was heated to 80° C. in a water bath and an additional amount of 307 g. of 2-chloro-6-phenylphenol and 120 ml. of a 50% aqueous solution of sodium hydroxide and 120 ml. of water was added. The mixture was refluxed for 24 hours, extracted with ether and the ether layer washed with Claisen's alkali (88 g. KOH dissolved in 63 ml. of water and diluted with 187 ml. of methanol), dried over anhydrous magnesium sulfate and distilled. By insuring adequate mixing of the sodium salt of the phenol during the reaction, yields of 100% with conversions of 75% were obtained. The methyl ether of 2-chloro-6-phenylphenol obtained by this method boiled at 146–151° C. at 15 mm. Hg pressure.

Example 2

This example illustrates the preparation of the Grignard reagent from the ether of Example 1 for use in the following examples. Initially, 10 ml. of a solution of 72.7 g. (0.33 mole) of the methyl ether of 2-chloro-6-phenylphenol prepared in Example 1, dissolved in 81 ml. of anhydrous tetrahydrofuran was added to a mixture of 8.1 g. (0.33 mole) of magnesium turnings covered with about 10 ml. of anhydrous ethyl ether in an oven dried flask in an anhydrous nitrogen atmosphere fitted with a condenser and nitrogen inlet tube. The reaction was initiated by adding 2 ml. of ethyl bromide, after which the remainder of the solution of the methyl ether of the phenol in tetrahydrofuran was added. The reaction was allowed to proceed with stirring for 2 hours without application of any external heating, but due to the heat of the reaction, the solution refluxed gently. After the initial 2 hour period, the reaction was refluxed by application of heating for an additional 2 hours and then cooled to room temperature.

Example 3

Using twice the amount of the Grignard reagent prepared in Example 2, 97.4 g. of α-tetralone was added cautiously to the Grignard reagent and refluxed for 3 hours. After cooling to room temperature, the reaction product was hydrolyzed by adding an excess of aqueous 10% hydrochloride acid until the initial cloudy solution became clear, indicating complete conversion of the magnesium salts to magnesium chloride. Following separation of the organic layer, the aqueous layer was extracted with ethyl ether and the organic layers were combined and distilled. After the ether and tetrahydrofuran were removed, 119.4 g. of product was obtained, which distilled at 190–215° C. at 0.3 mm. Hg pressure. No attempt was made to determine how much of the methyl ether of 2-(1'-hydroxy-1',2',3',4'-tetrahydro-1'-naphthyl) - 6 - phenylphenol was dehydrated to the methyl ether of 2-(3',4'-dihydro-1'-naphthyl)-6-phenylphenol by this distillation since the next step would dehydrate the balance as well as dehydrogenate the tetrahydronaphthyl group to the naphthyl group.

This intermediate reaction product was heated to 195° C. under vacuum with 12 g. of a 3% palladium on carbon powder. After 10 minutes, the vacuum was removed and the mixture heated to 300° C. in a current of nitrogen and held at this temperature until no further hydrogen evolution could be detected. After cooling to 98° C., the product was diluted with 150 ml. of n-heptane and the catalyst suspension removed by filtration.

Following evaporation of the heptane, the product was demethylated to the desired phenol by refluxing with 125 ml. of acetic acid and 125 ml. of 57% aqueous hydriodic acid for 16 hours. After cooling, the organic layer was separated and the aqueous layer extracted with 400 ml. of n-heptane. The heptane solution was added to the organic phase and extracted with 300 ml. of Claisen's alkali, (88 g. KOH in 63 ml. of water and diluted with 187 ml. of methanol). The alkaline layer was separated and neutralized with hydrochloric acid and then extracted with 400 ml. of ethyl ether. The ether layer was dried over anhydrous magnesium sulfate and evaporated to dryness. On distillation, a yield of 62.6 g. of product, boiling at 204–210° C. at 0.25 mm. Hg pressure, was obtained. The product was further purified by recrystallization, by dissolving it in hot methanol and adding sufficient water to cause haziness. A yield of 13.5 g. of 2-(1'-naphthyl)-6-phenylphenol was obtained, having a melting point of 94.3–95.5° C. Analysis of this product showed that it contained 89.9% C. and 5.4% H. compared to the theoretical of 89.2% C. and 5.4% H.

Example 4

This example illustrates the preparation of 2-(o-biphenylyl)-6-phenylphenol which alternatively may be named 2-(2'-phenylphenyl) - 6-phenylphenol. Using the same amount of Grignard reagent as prepared in Example 2, 58 g. of 2-phenylcyclohexanone dissolved in tetrahydrofuran was added dropwise at a sufficient rate to maintain a rapid reflux. After the exothermic reaction was complete, the solution was refluxed overnight (approximately 15 hours). This reaction mixture was hydrolyzed by adding an excess of 10% aqueous hydrochloric acid until the initial cloudy mixture became clear. The organic layer was separated and the aqueous layer extracted from the ether and combined with the organic layer and dried over anhydrous magnesium sulfate. After evaporation of the ether and tetrahydrofuran, the product was distilled. A yield of 39.2 g. of product distilling at 260–295° C. at 10 mm. Hg was obtained.

This product was slowly heated to 225° C. under vacuum with 10 g. of 2% palladium on carbon powdered catalyst, and the further at atmospheric pressure in nitrogen atmosphere to 300° C. until there was no further evidence of hydrogen avolution. After cooling, the product was dissolved in n-heptane and filtered to remove the catalyst. Afterwards the solvent was evaporated. The product was demethylated by heating at reflux in a nitrogen atmosphere with 100 ml. of acetic acid and 100 ml.

of 57% aqueous hydrogen iodide solution for a period of 23 hours. Following cooling, two phases separated. After adding 600 ml. of water, the white crystalline product was removed by filtration and dried in a vacuum oven at 50° C. The dried product was suspended in 100 ml. of hot n-heptane and added to 150 ml. of Claisen's alkali, (88 g. KOH in 63 ml. of water and diluted with 187 ml. of methanol). The alkali extract was neutralized with hydrochloric acid and the product extracted with ethyl ether.

Upon evaporation of the ether, the product was dissolved in methanol and placed in a freezer overnight. A yield of 15.2 g. of colorless crystals were obtained of the 2-(o-biphenylyl)-6-phenylphenol which melted at 118.4–120.1° C. It had a mixed melting point of 119–120.5° C. with the same product compared by a different method as described in the next example showing that they were identical.

Example 5

This example illustrates another method for the preperation of 2-(o-biphenylyl)-6-phenylphenol. A mixture of 500 g. of 2-cyclohexylcyclohexanone, 20 g. of potassium hydroxide, 50 ml. of toluene and 10 ml. of water were heated and refluxed using a trap to collect the water which was azeotroped from the solution. After 5 hours, an additional 5 g. of potassium hydroxide, 10 ml. of water and 20 ml. of toluene were added, and the mixture allowed to stand at room temperature overnight. The reaction mixture was extracted with ether, washed with diluted hydrochloric acid followed by washing with water and then dried.

After evaporation of the ether, the reaction mixture was distilled to obtain 159.4 g. of 2-cyclohexyl-6-(2'-cyclohexylcyclohexenyl)cyclohexanone boiling at 140–220° C. at 0.4 mm. Hg pressure. This was dehydrogenated by heating with 20 g. of 3% palladium on carbon powder in vacuum to 225° C. over a period of 5 hours and then for an additional 3 hours at this temperature, after which the vacuum was removed and the reaction mixture heated for 4 hours at atmospheric pressure at 310° C. The reaction mixture was diluted with toluene and filtered to remove the catalyst. The filtrate was extracted with Claisen's alkali and the alkaline solution was solidified and extracted with ethyl ether. The ether layer was dried over anhydrous magnesium sulfate. Upon evaporation of the ether, the product was distilled with the main fraction distilling at 160°–210° C. at 0.5 mm. Hg pressure. A yield of 13 g. was obtained.

After recrystallization from methyl alcohol, 7 g. of 2-(o-biphenylyl)-6-phenylphenol was obtained having a melting point of 117° C. Elemental analysis showed that the product had 89.2% carbon and 5.5% hydrogen compared to the theoretical of 89.4% carbon and 5.6% hydrogen.

Example 6

This example illustrates the preparation of 2-(4'-t-butylphenyl)-6-phenylphenol, using 3 times the amount of Grignard reagent prepared in Example 2. 154 g. of 4-t-butylcyclohexanone dissolved in tetrahydrofuran was added over 1½ hour period and then refluxed for 2 hours. It was allowed to stand with stirring at room temperature overnight. The reaction mixture was hydrolyzed and extracted with ethyl ether as described in Example 3, and then distilled. A yield of 148.5 g., boiling at 140–225° C. at 0.2 mm. Hg pressure was obtained.

This intermediate product was heated with a 20 g. of 5% palladium on carbon powder under vacuum until no more hydrogen evolution could be detected. The product was diluted with heptane and the catalyst suspension removed by filtration. This product was demethylated as described in Examples 3, using 225 ml. of 57% aqueous hydrogen iodide and 225 ml. of glacial acetic acid. After demethylation, the solution was washed 3 times with 300 ml. of heptane and the heptane layer extracted 4 times with 200 ml. of 12% aqueous sodium hydroxide, followed by 4 extractions with 500 ml. of Claisen's alkali. Each time Claisen's alkali was added, a precipitate formed in both the aqueous and organic layers. This material was removed by filtration and combined with the alkali layer and acidified. This was extracted with ethyl ether, and after drying of the ether layer, over anhydrous magnesium sulfate, the ether was evaporated leaving a yellow oil which crystallized overnight at room temperature. The product was recrystallized from heptane, giving a yield of 90.7 g. of 2 - (4' - t-butylphenyl)-6-phenylphenol which had a melting point of 80.0–81.6° C. Elemental analysis showed that it had 87.1% carbon and 7.4% hydrogen compared to the theoretical of 87.4% carbon and 7.3% hydrogen.

Example 7

The same amount of Grignard reagent as prepared in Example 2 was reacted with 62.0 g. of 3,4-diphenylcyclohex - 2 - ene-1-one in 100 ml. of tetrahydrofuran. The mixture was refluxed for 1½ hours and hydrolyzed and extracted with ethyl ether as described in Example 3.

This product was heated to 225° C. under vacuum with 15 g. of 10% palladium on carbon powder for a period of 2 hours. The vacuum was then removed and the solution was heated at atmospheric pressure at 295° C. until no further hydrogen evolution could be detected. It was diluted with hot heptane to permit the catalyst suspension to be removed by filtration. Afterwards, the solvent was evaporated and the product was demethylated as described in Example 3, by heating for 17 hours with 100 ml. of 57% aqueous hydrogen iodide and 100 ml. of glacial acetic acid. The phenolic product was isolated as described in Example 3. After recrystallization from methanol, a yield of 24.5 g. of 2 - phenyl - 6-(3'-o-terphenylyl)phenol was obtained having a melting point of 161.0–162.9° C. Elemental analysis showed that it contained 90.7% carbon and 5.7% hydrogen compared to the theoretical of 90.4% carbon and 5.6% hydrogen.

Example 8

This example illustrates preparation of 2 - (4' - methylphenyl)-6-phenylphenol. Using 3 times the amount of Grignard reagent as described in Example 2, 112.0 g. of 4 - methylcyclohexanone was added over a 1 hour period to the Grignard reagent. Afterwards, this solution was refluxed for 1 hour. The reaction mixture was hydrolyzed and extracted with ethyl ether as described in Example 3. The evaporation of the ether yielded a yellowish oil. Upon distillation, a yield of 193.1 g. of product, boiling at 135–220° at 0.5 mm. Hg pressure was obtained. This product was heated with 20 g. of 5% palladium on carbon for 2½ hours at 150° C. under vacuum, and then for 4 hours at 205° C. Afterwards, the vacuum was removed and it was heated for 30 minutes at 300° C. until no further evolution of hydrogen could be detected. The product was diluted with heptane and the catalyst suspension was removed by filtration, the product was demethylated as described in Example 3, by heating for 24 hours with 200 ml. of 57% aqueous hydrogen iodide and 200 ml. of glacial acetic acid. The demethylated product was treated with Claisen's alkali as described in Example 3. Distillation gave a yield of 90.5 g., boiling at 140–165° C. at 0.15–0.20 mm. Hg pressure. Crystallization from n-pentane at −20° C. yielded 32.7 g. of material having a melting point of 58.0 C., which on further recrystallization from n-pentane, yielded 25.5 g. having a melting point of 61.6–62.9° C. Thin layer chromatography showed the presence of a slight trace of o-phenylphenol. This was removed by extracting an ether solution of the product with 15% aqueous sodium hydroxide. Evaporation of the ether and recrystallization from n-pentane raised the melting point of this product to 62.1–63.2° C. Elemental analysis showed it contained 87.6% carbon and 6.1% hydrogen compared to 87.7% carbon and 6.2% hydrogen.

Example 9

In the same way as described in Example 8, 2-(2'-methylphenyl)-6-phenylphenol was obtained by using 2-methylcyclohexanone in place of the 4-methylcyclohexanone. This material has a melting point of 41.0–45.2° C.

Example 10

This example illustrates the preparation of 2 - (m-biphenylyl)-6-phenylphenol. A 15% solution of 1.0 mole of butyl lithium in n-heptane was heated under vacuum on a steam bath in a three-necked flask until the heptane was removed. Nitrogen was introduced to break the vacuum and the flask was fitted with a thermometer and equilizing dropping funnel. The butyl lithium was cooled to 0° C. and anhydrous diethyl ether added and the solution further cooled to −60° C. A solution of 1.0 mole of dibenzofuran in 1500 ml. of tetrahydrofuran was added slowly while maintaining the temperature at −60° C.

After addition, the solution was stirred 30 minutes at −60° C., allowed to warm slowly to 0° C. and held at that temperature for 30 minutes and recooled to −60° C. A solution of 1.0 mole of cyclohexanone was added dropwise, after which the solution was allowed to warm to room temperature. The solution was hydrolyzed with dilute hydrochloric acid, extracted with ether and distilled. The 1-cyclohexenyldibenzofuran which was produced from this reaction was dehydrogenated by heating with 4 g. of 5% platinum on carbon powder to 330° C. for 5 hours, to produce 1-phenyldibenzofuran. Elemental analysis showed that this product contained 88.6% carbon and 5.1% hydrogen compared with the theoretical of 88.5% carbon and 5.0% hydrogen.

Using the 1-phenyldibenzofuran so prepared, the entire series of steps described above were repeated using this product in place of the initial dibenzofuran, thereby producing 1,8-diphenyldibenzofuran. A solution of 16 g. of the 1,8-diphenyldibenzofuran so prepared and 200 ml. of anhydrous p-dioxane and 3 g. of sodium metal were refluxed for 16 hours. The mixture was hydrolyzed with dilute hydrochloric acid. The p-dioxane and water were removed on a rotating evaporator, water and ethyl ether were added to the dry mixture and the ether and water was extracted with Claisen's alkali. The alkali layer was neutralized with hydrochloric acid and extracted with ether. After the evaporation of the ether layer, a yield of 2 g. of 2-(m-biphenylyl)-6-phenylphenol was obtained. After recrystallization from methanol, elemental analysis showed that the product contained 89.3% carbon and 5.6% hydrogen compared to the theoretical of 89.4% carbon and 5.6% hydrogen. The material had a melting point of 101.2–101.7° C.

Other modifications to this invention and variations and procedures may be employed without departing from the scope of this invention. For example, the palladium or platinum catalyst may be used without a supporting substrate and various substrates other than carbon; for exampel, pumice, alumina, silica, etc. may be used.

As described previously, the diarylphenols of this invention may be used for making polyphenylene ethers as oxidation inhibitors in lubricating oil, etc.

These and other modifications of this invention, which will be readily discernible to those skilled in the art, may be employed within the scope of the invention. The invention is intended to include all such modifications and variations as may be embraced within the following claims.

What I claim as new and desire to secure by Letters Patent of the United States is:

1. The 2,6-diarylphenols having the formula

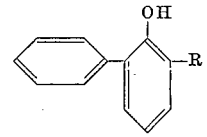

where R is a monovalent substituent selected from the group consisting of $C_{1-8}$ alkyl substituted phenyl, biphenylyl, terphenylyl and naphthyl.

2. The compounds of claim 1 wherein R is $C_{1-8}$ alkyl substituted phenyl.
3. The compounds of claim 1 wherein R is tolyl.
4. The compounds of claim 1 wherein R is t-butylphenyl.
5. The compounds of claim 1 wherein R is biphenylyl.
6. The compounds of claim 1 wherein R is terphenylyl.
7. The compounds of claim 1 wherein R is naphthyl.

References Cited

Beilstein: Organische Chemie, vol. 6, 3rd supplement, p. 3688.

Munk et al.: Chemistry 51, 771–8 (1957), c.a. 51, 11,261c.

Steuber et al.: Chem. Berichte 99, 258–60 (2–1966).

LEON ZITVER, Primary Examiner

NORMAN P. MORGENSTERN, Assistant Examiner

U.S. Cl. X.R.

252—404, 9; 260—612